US011573710B2

(12) United States Patent
Shah et al.

(10) Patent No.: US 11,573,710 B2
(45) Date of Patent: Feb. 7, 2023

(54) PROTECTION DOMAINS FOR FILES AT FILE-LEVEL OR PAGE-LEVEL

(71) Applicant: Microsoft Technology Licensing, LLC, Redmond, WA (US)

(72) Inventors: Purvi Shah, Redmond, WA (US); Georgiy I. Reynya, Redmond, WA (US); Stanislav A. Oks, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 69 days.

(21) Appl. No.: 16/545,944

(22) Filed: Aug. 20, 2019

(65) Prior Publication Data

US 2021/0055869 A1    Feb. 25, 2021

(51) Int. Cl.
*G06F 12/00*    (2006.01)
*G06F 3/06*    (2006.01)
*G06F 16/13*    (2019.01)

(52) U.S. Cl.
CPC .......... *G06F 3/0619* (2013.01); *G06F 3/0643* (2013.01); *G06F 3/0656* (2013.01); *G06F 3/0659* (2013.01); *G06F 3/0679* (2013.01); *G06F 16/13* (2019.01)

(58) Field of Classification Search
CPC .... G06F 3/0619; G06F 3/0643; G06F 3/0656; G06F 3/0659; G06F 3/0679; G06F 16/13
See application file for complete search history.

(56) References Cited

U.S. PATENT DOCUMENTS 6,859,867 B1 *    2/2005    Berry .................. G06F 12/1475
                                                                711/E12.095
7,287,140 B1 *    10/2007    Asanovic ............ G06F 12/1483
                                                                711/208
(Continued)

OTHER PUBLICATIONS

"Memory Protection Keys for Userspace", Retrieved From: https://www.kernel.org/doc/Documentation/x86/protection-keys.txt, Retrieved On: Jun. 26, 2019, 2 Pages.
(Continued)

*Primary Examiner* — David Yi
*Assistant Examiner* — Tahilba O Puche
(74) *Attorney, Agent, or Firm* — Fiala & Weaver P.L.L.C.

(57) ABSTRACT

Methods, systems and computer program products are provided for managing protection domains (PDs) for files at a file-level or a page-level. PDs may be allocated for multiple purposes, e.g., to protect processes, files, buffers, etc. Files stored in nonvolatile memory (NVM) subject to direct access (DAX) may be protected by file-level or page-level PDs. PDs may comprise protection keys (PKEYs) with user-configurable read and write access control registers (PKRUs). NVM files may be protected from corruption (e.g. by stray writes) by leaving write access disabled except for temporary windows of time for valid writes. File PDs may be managed by a file manager while buffer PDs may be managed by a buffer pool manager. File associations between PDs, files and file address space may be maintained in a file object. Buffer associations between PDs, buffers and buffer address space may be maintained in a buffer descriptor.

20 Claims, 5 Drawing Sheets

(56) References Cited

U.S. PATENT DOCUMENTS

| | | | | |
|---|---|---|---|---|
| 7,464,191 B2* | 12/2008 | Arndt | | G06F 12/0653 710/36 |
| 8,397,306 B1* | 3/2013 | Tormasov | | G06F 21/00 713/166 |
| 9,003,106 B1* | 4/2015 | Clark | | G06F 12/0246 711/103 |
| 9,934,166 B2* | 4/2018 | Wilkerson | | G06F 9/30043 |
| 2003/0084256 A1* | 5/2003 | McKee | | G06F 12/1491 711/206 |
| 2003/0105914 A1* | 6/2003 | Dearth | | G06F 12/1072 711/E12.066 |
| 2006/0026385 A1* | 2/2006 | Dinechin | | G06F 12/1036 711/206 |
| 2007/0078892 A1* | 4/2007 | Boyd | | G06F 21/85 |
| 2007/0168567 A1* | 7/2007 | Boyd | | G06F 9/544 710/5 |
| 2008/0222397 A1* | 9/2008 | Wilkerson | | G06F 12/145 712/E9.016 |
| 2016/0110298 A1* | 4/2016 | Koufaty | | G06F 21/52 726/28 |
| 2016/0170910 A1* | 6/2016 | Inamdar | | G06F 12/1036 711/163 |
| 2016/0350019 A1* | 12/2016 | Koufaty | | G06F 12/08 |
| 2017/0160979 A1 | 6/2017 | Golander et al. | | |
| 2017/0212918 A1* | 7/2017 | Johnsen | | H04L 63/20 |
| 2017/0286326 A1* | 10/2017 | Guim | | G06F 21/79 |
| 2018/0095892 A1* | 4/2018 | Wilkinson | | G06F 12/145 |
| 2018/0268170 A1* | 9/2018 | Li | | G06F 21/6281 |
| 2019/0042733 A1* | 2/2019 | Zhang | | G06F 21/52 |
| 2019/0073145 A1* | 3/2019 | Angelino | | G06F 12/1441 |
| 2019/0243780 A1* | 8/2019 | Gopal | | G06F 12/0811 |

OTHER PUBLICATIONS

Mulnix, David, "Intel Xeo Processor Scalable Family Technical Overview", Retrieved From: https://software.intel.com/en-us/articles/intel-xeon-processor-scalable-family-technical-overview, Jul. 10, 2017, 49 Pages.

Hedayati, et al., "Hodor: Intra-Process Isolation for High-Throughput Data Plain Libraries", In Proceedings of The USENIX Annual Technical Conference, Jul. 10, 2019, pp. 489-503.

"International Search Report and Written Opinion Issued in PCT Application No. PCT/US20/037678", dated Oct. 6, 2020, 12 Pages.

* cited by examiner

PROTECTION DOMAINS FOR FILES AT FILE-LEVEL OR PAGE-LEVEL

BACKGROUND

Information in storage devices subject to direct access writes may be vulnerable to corruption by stray overwrites.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are provided for managing protection domains (PDs) for files at a file-level or a page-level. PDs may be allocated for multiple purposes, e.g., to protect processes, files, buffers, etc. Files stored in nonvolatile memory (NVM) subject to direct access (DAX) may be protected by file-level or page-level PDs. PDs may comprise protection keys (PKEYs) with user-configurable read and write access control registers (PKRUs). NVM files may be protected from corruption (e.g. by stray writes) by leaving write access disabled except for temporary windows of time for valid writes. File PDs may be managed by a file manager while buffer PDs may be managed by a buffer pool manager. File associations between PDs, files and file address space may be maintained in a file object. Buffer associations between PDs, buffers and buffer address space may be maintained in a buffer descriptor.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGS.

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Computers may comprise primary and secondary storage. Primary storage may comprise, for example, fast access, but typically volatile (e.g. temporary storage), memory devices, such as random access memory (RAM) internal to a processor (e.g. CPU cache) or external to and directly accessible by a processor (e.g. main memory). Compared to static RAM (SRAM), dynamic RAM (DRAM) may be less costly and use less power, but may need to be refreshed (e.g. thousands of times per second). Primary storage many include some non-volatile (e.g. permanent) memory (e.g. read-only memory (ROM) devices that store programs called firmware). Secondary storage may comprise, for example, slower access, but larger and non-volatile (e.g. permanent storage) memory devices that may be indirectly accessed by a processor, such as a hard disk drive (HDD), solid state drive (SSD), optical drive, ROM, flash memory, non-volatile memory (NVM) or other non-volatile storage. NVM may be the fastest type of secondary storage (e.g. nearly as fast or a few multiples slower than primary storage).

Computers may be programmed (e.g. with programs) to perform specified functions. An integrated program may comprise multiple programs. A program (e.g. an application) executed by one or more processors (e.g. CPUs) may be referred to as a process. A process may be divided into tasks (e.g. sequences of instructions) that may be executed (e.g. concurrently) as threads. Processes (and threads) may be assigned portions of memory to accomplish their respective functions or tasks. Computer hardware (e.g. a memory management unit (MMU)) and software (e.g. a memory management portion of an operating system (OS) program) may manage memory resources for processes. Primary (main) memory resources may be insufficient for all processes. Secondary memory may supplement primary memory to provide sufficient memory assigned to processes. Available primary and secondary memory may be discontinuous (fragmented).

Virtual memory may simplify processes by appearing to provide each process with its own continuous block of main memory, even though the virtual memory block may actually map to disparate portions of primary and/or secondary memory and even though the total virtual (primary) memory may exceed actual (physical) memory. Virtual memory may (e.g. in addition to simplifying processes) improve process security by isolating process memory. An OS virtual memory manager (VMM) and CPU MMU may manage memory for processes, including mapping from virtual addresses to physical addresses. A process may operate based on virtual memory specified by an OS while a CPU may interface with the OS to fetch and execute instructions from physical (e.g. primary or secondary) memory.

An OS virtual memory manager (VMM) may use paging, for example, to overcome primary memory limitations. A VMM may reserve space on secondary memory to virtually extend primary memory. The reserved area of secondary memory used by an OS as if it were primary memory may be referred to as a page (or paging) file. A VMM may move data between primary and secondary memory (e.g. to or from the paging file in secondary memory), for example, when a process references data stored on secondary memory. Transferring data between primary and secondary memory may be referred to as disc paging or swapping (e.g. paging-in from secondary to primary memory or paging-out from primary to secondary memory), although secondary memory is not limited to a disc. Demand paging may refer to allocating (paging/swapping) primary memory at a thread level, for example, for multiple concurrent processes when there is insufficient primary memory for full processes. A VMM may access (e.g. read or write) data between primary storage and secondary storage in blocks, which may be referred to as pages. Paging algorithms may implement one or more page sizes. Like physical memory, virtual memory may be divided into units called pages. A page may comprise a virtual entity that exists in the form of a page address in a page table. A page in virtual memory may correspond to a page frame array in physical memory.

An OS may maintain a virtual to physical address translation table called a page table for each process. An OS paging supervisor may manage page tables. A page table, which is a data structure, may map virtual page addresses (used by processes) to physical page addresses (used by hardware such as a CPU). A page table may comprise page addresses in an array. Indexes of the array may represent virtual page addresses. Array values (referred to as page table entries (PTEs)) may represent the corresponding page frame addresses in physical memory. A virtual address may comprise a page number (p) and an offset into a page (d). A physical address may comprise a frame number (f) and an offset (d). PTEs may (e.g. also) include process control information, which may indicate, for example, the state and attributes of a process memory, such as validity (e.g. to indicate whether the address refers to a page frame on physical memory), modified data (e.g. to indicate process data has been modified), access protection (e.g. to limit read and/or write access) and process identification. A page directory may reference each page table.

A CPU MMU may have a virtual to physical address translation cache, which may be referred to as a translation lookaside buffer (TLB). A TLB may store recently translated addresses for pages in the page table. An MMU may check the (e.g. faster) TLB before checking the page table. When the translated address exists in the TLB, it is called a TLB Hit, and when a page is not found, it is called a TLB Miss, leading to a page table access in memory and (e.g. if a mapping exists in the page table) writing the mapping to the TLB. A page fault may occur, for example, when a process references a page that is not present in primary memory. An OS may use a page replacement algorithm to determine which pages to swap between primary and secondary memory (e.g. for page faults and/or for swap prefetch).

Information in storage devices such as NVM subject to direct access (DAX) writes may be vulnerable to corruption, for example, by stray overwrites. In a typical storage system, stored data may be read and written in local storage. A write occurs to where a page is cached in RAM, before eventually being pushed out to storage (e.g. HDD), such that, if a stray write were to corrupt data in local storage, a correction may be made prior to pushing to storage. DAX access to NVM for buffer pool page writes and memory mapped file writes may eliminate caching data in local storage, which may (e.g. also) eliminate the opportunity to correct stray writes, leading to potential corruption of NVM files.

Methods, systems and computer program products are provided for managing protection domains (PDs) for files at a file-level or a page-level. PDs may be allocated for multiple purposes, e.g., to protect processes, files, buffers, etc. Files stored in nonvolatile memory (NVM) subject to direct access (DAX) may be protected by file-level or page-level PDs. PDs may comprise protection keys (PKEYs) with user-configurable read and write access control registers (PKRUs). NVM files may be protected from corruption (e.g. by stray writes) by leaving write access disabled except for temporary windows of time for valid writes. File PDs may be managed by a file manager while buffer PDs may be managed by a buffer pool manager. File associations between PDs, files and file address space may be maintained in a file object. Buffer associations between PDs, buffers and buffer address space may be maintained in a buffer descriptor.

Figure 1:
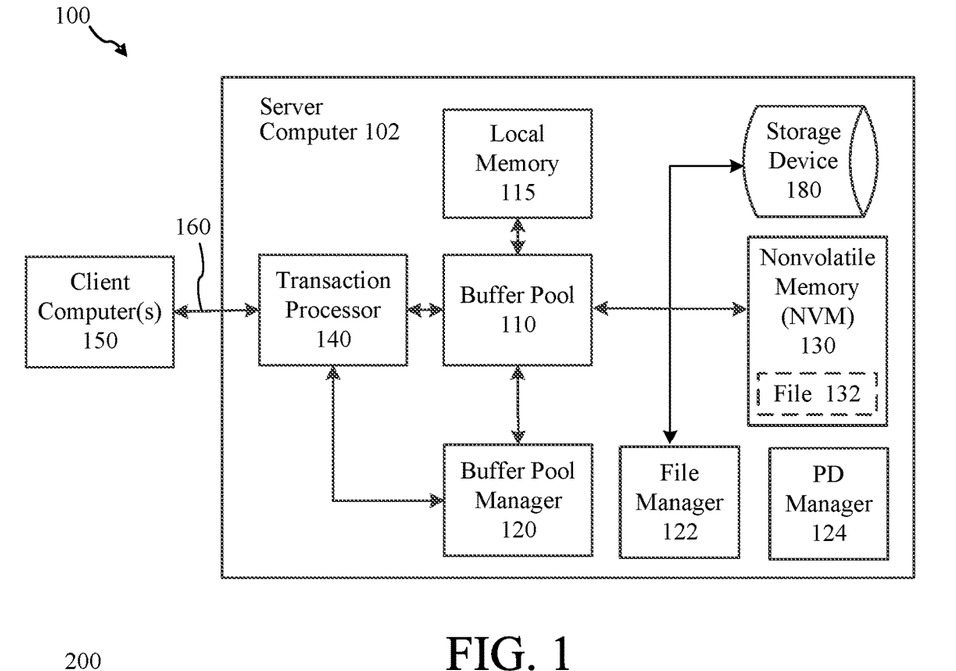
FIG. 1 shows a block diagram of an example computing environment to manage protection domains for files, according to an example embodiment.

FIG. 1 shows a block diagram of an example computing environment 100 to manage protection domains for files, according to an example embodiment. Example computing environment 100 comprises server computer 102 and client computer(s) 150 coupled by network 160. Features presented for one computer may be implemented on any computer. For example, features presented for server computer 102 may be implemented on client computer(s) 150 an any other computer.

Network 160 may comprise any computer network supporting interaction between client computer(s) 150 and server computer 102, whether private and/or publicly accessible, and may support wired and/or wireless connectivity. For example, network 160 may include one or more of any of a local area network (LAN), a wide area network (WAN), a personal area network (PAN), a combination of communication networks, such as the Internet, and/or a virtual network. Server computer 102 and client computer(s) 150 may have at least one network interface. Examples of a network interface, wired or wireless, may include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described for FIG. 9. Network 160 may be implemented using any available network communication protocol, such as, but not limited to, Ethernet and/or TCP/IP.

Figure 9:
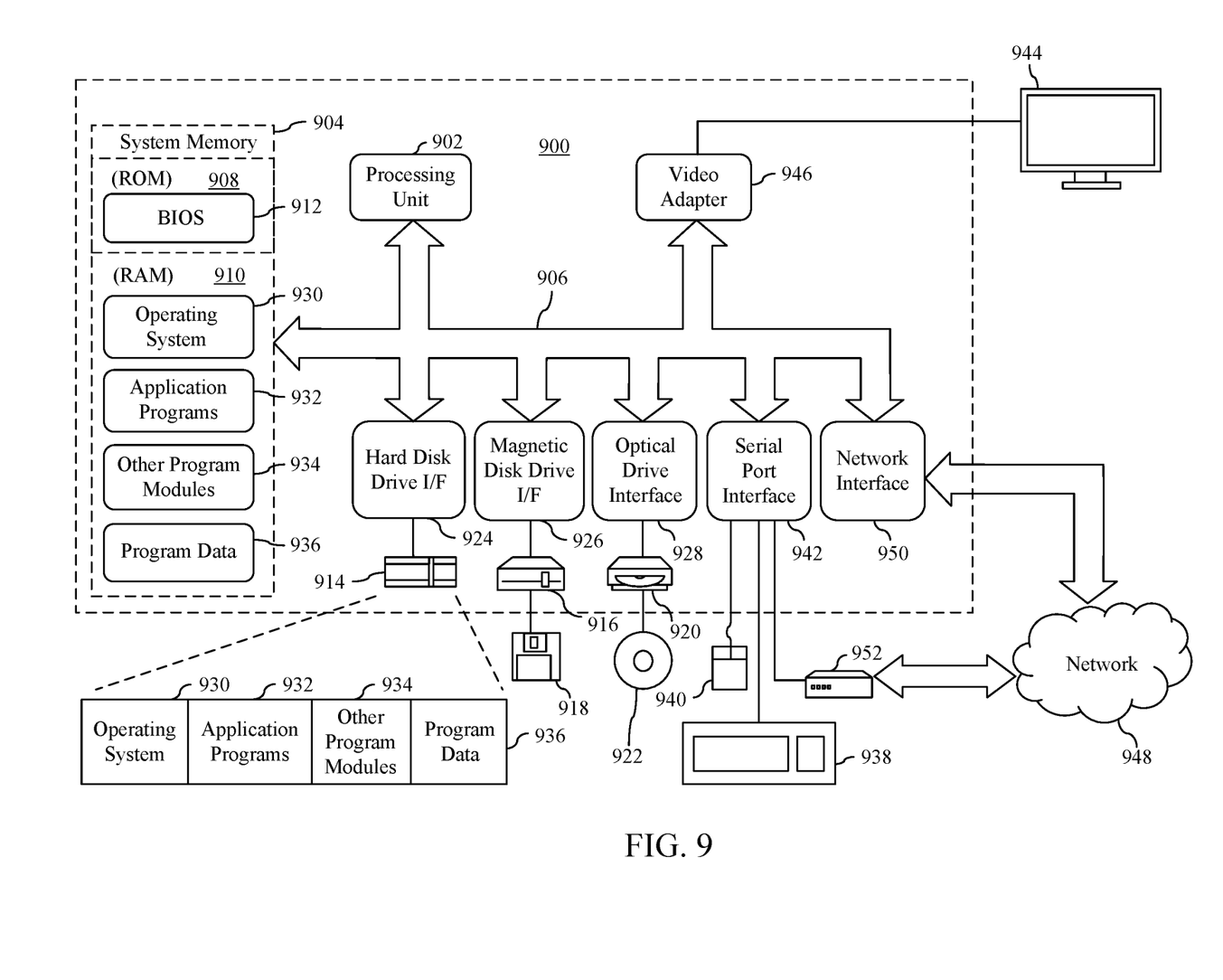
FIG. 9 shows a block diagram of an example computing device that may be used to implement example embodiments.

Server computer 102 and client computer(s) 150 may comprise any computing device. An example computing device is shown in FIG. 9. Server computer 102 and client computer(s) 150 may represent any number of computing devices. Server computer 102 and client computer(s) 150 may comprise any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Server computer 102 and client computer(s) 150 are not limited to physical machines, but may include other types of machines or nodes, such as a virtual machine. Server computer 102 and client computer(s) 150 may comprise one or more applications, operating systems, program interfaces, network interfaces, virtual machines, storage devices, etc. that may be executed, hosted, and/or stored therein or via one or more other computing devices via network 160.

Server computer 102 comprises, for example, buffer pool 110, local memory 115, buffer pool manager 120, file manager 122, protection domain (PD) manager 124, nonvolatile memory (NVM) 130, transaction processor 140 and storage device 180. FIG. 1 presents a simplified component diagram of server computer 102 that does not show or describe many hardware, firmware and software components that may be implemented on server computer 102 and other computers that may implement the subject matter described herein (e.g. protection domains for files at one or more levels).

Server computer 102 may store data (e.g. persistently) in persistent storage devices, such as storage device 180 and NVM 130, which may be utilized as a persistent storage device in a manner similar to storage device 180. Storage device 180 may comprise, for example, one or more disk-based storage and/or solid state storage devices (SSDs). Other examples are shown in FIG. 9.

NVM 130 may have a lower latency, for example, than disk-based storage devices and SSD. Latency of a memory or storage device, as used herein, is the amount of time between the time a read request is received on an input and the time the requested data is provided on an output. In an example memory system, some forms of NVM that may be used as a persistent storage device may have a latency on the same order of magnitude as, or a small multiple of, latency of other memory devices that may be used as local memory 115, such as dynamic random-access memory (DRAM) or static random-access memory (SRAM).

NVM 130 may comprise any of variety of nonvolatile memory technologies that may be referred to (e.g. interchangeably) as NVM, storage class memory (SCM), persistent memory (PMEM), direct access (DAX) memory, byte addressable storage, etc. A nonvolatile memory may be a computer storage device whose contents are not lost when power is removed. A device may be byte-addressable when a single, addressable unit of data, e.g., a byte, may be accessed without requiring access to neighboring units of data (e.g. without accessing a block such as a page of data). Memory may be considered storage class, for example, when it is sufficiently high capacity to persistently store data in an application, such as a file system or database system. Examples of NVM include, 3D-XPoint™ memory (available under the QuantX™ brand from Micron® Technology and OPTANE™ brand from Intel®) and NVDIMM memory modules from Hewlett Packard Enterprise™. Other examples of NVM include NAND and NOR flash memories, ferroelectric RAM (FeRAM, F-RAM or FRAM), programmable metallization cell (PMC) memory, conductive bridging RAM (CBRAM), phase-change RAM (PRAM or PCM), silicon-oxide-nitride-oxide-silicon (SONOS) memory, resistive RAM (RRAM or ReRAM), Racetrack or domain-wall memory (DWM), carbon nanotube based RAM (NRAM or Nano-RAM), and spin-transfer torque-magnetoresistive random-access memory (STT-MRAM).

Access to files in storage device 180 or NVM 130 may be buffered, for example, by copying files stored therein to page cache (e.g. local memory 115). Copying to local memory 115 may be eliminated for data stored on NVM 130. Applications may access NVM 130 like they do local memory 115, which may eliminate paging blocks of data to/from local memory 115, for example, as may occur back and forth between local memory 115 and storage device 180. Applications (e.g. transaction processor 140) may use system calls (e.g. memcpy( ), memmap( ), to access NVM 130.

Local memory 115 may (e.g. generally) be volatile memory, which is computer memory that requires power to maintain stored information. Examples of volatile memory include SRAM and DRAM. SRAM may (e.g. generally) use six transistors to store a bit of information. SRAM maintains its state so long as it is powered. SRAM may have simple controls to read and write data given an input address. DRAM may (e.g. generally) use a single transistor and capacitor to store a bit of information. DRAM utilizes (e.g. regular) refresh signals to maintain its state. DRAM may have more complex interactions than SRAM for reading and writing data given an input address. Other examples of local memory 115 include, for example, volatile memory such as zero-capacitor RAM (Z-RAM) and capacitor-less twin-transistor RAM (TTRAM). In some implementations, local memory 115 may comprise a form of NVM.

Transaction processor 140 may comprise an application, such as Microsoft SQL Server®. Transaction processor 140 may be responsive to requests (e.g. from applications (not shown) on client computer(s) 150) to process data (e.g. in a database or other storage that may be accessible by server computer 102). Transaction processor 140 may access data from a database, for example, through buffer pool 110. There may be multiple transaction processors 140. Buffer pool manager 120 may assign one or more logical buffers in buffer pool 110 to (e.g. each) transaction processor 140.

While FIG. 1 illustrates a server computer and transaction processor for a database application, this configuration is merely illustrative. Other computers and other applications may be utilized with protection domains (e.g. for buffers, files, processes and so on).

Buffer pool 110 may comprise a resource (e.g. shared by multiple databases) for cached data pages. Buffer pool 110 may comprise a portion of virtual address space allocated to an application (e.g. a database application such as Microsoft SQL Server®). Buffer pool 110 may cache recently or frequently used pages in buffers. In an example, there may be a buffer pool per instance of Microsoft SQL Server®.

Buffer pool 110 may reference an array of buffers. Buffer pool 110 may reference a larger array of buffers, for example, by directly referencing NVM 130 without caching (e.g. in local memory 115) data stored in NVM 130. A larger array of buffers may provide a larger working set, which may reduce page evictions, reduce a frequency of writing dirty pages to storage and increase transaction capacity and throughput. Buffer pages may be linked directly to NVM locations of database files. In other words, files on NVM may be mapped into memory direct to NVM without copying to RAM.

Buffer pool 110 may comprise a data structure that defines a collection of logical buffers in which data resides for access by applications, such as transaction processor 140. A logical buffer may comprise a data structure (e.g. buffer descriptor) with (e.g. among other information) a state and a reference to a set of locations in memory. In an example memory system, memory locations of a buffer may refer to a local memory 115, such as dynamic random-access memory (DRAM) or static random-access memory (SRAM), or NVM 130, which may be used as a persistent storage device (e.g. for a file system or database system).

Memory location data in a logical buffer data structure may reference local memory 115 or NVM 130, for example, when the state of a logical buffer permits read and/or write access. In a typical storage system, stored data may be read and written in local storage. A write occurs to where a page is cached in RAM, before eventually being pushed out to storage (e.g. HDD), such that, if a stray write were to corrupt data in local storage 115, a correction may be made prior to pushing to storage device 180. Direct write access to NVM 130 for buffer pool page reads and writes may eliminate caching data in local storage 115, which may (e.g. also) eliminate the opportunity to correct stray writes, leading to potential corruption of NVM 130.

Buffer pool manager 120 may manage buffer pool 110. Buffer pool manager 120 may, for example, manage (e.g. allocate and free) data structures (e.g. buffer descriptors) and page frames for buffers. A buffer descriptor may describe a cached page and its state. A page frame may comprise memory (e.g. local memory 115 or NVM 130) containing data referenced by a buffer descriptor. Buffer pool manager 120 may communicate with transaction processor 140, for example, to determine which information (e.g. in storage device 180 and/or NVM 130) buffer pool manager 120 should reference in buffer pool 110, and what information to copy (e.g. from storage device 180) into local memory 115. Buffer pool manager 120 may allocate a page frame, for example, when a buffer without a page frame (e.g. in local memory 115 or NVM 130) is referenced. Buffer pool manager 120 may create a buffer descriptor for a page frame. Buffer pool manager 120 may copy data from storage device 180 to local memory 115, for example, when data is stored in storage device 180. Buffer pool manager 120 may not copy data from NVM 130 to local memory 115, for example, when data is stored in NVM 130.

Transaction processor 140 may comprise an application (e.g. Microsoft SQL Server®). Transaction processor 140 may process requests (e.g. database queries) received from client computer(s) 150. Transaction processor 140 may utilize (e.g. read and write) data in buffer pool 110, for example, to process transactions. Transaction processor 140 may directly write to and read from NVM 130 without copying the data into local memory 115 and without significantly affecting performance. In various implementations, NVM latency be approximately the same (e.g. within 0 to 10% above or below) or a relatively small multiple of (e.g. 1 to 50 times) local memory latency. Direct access to data in NVM 130 versus local memory 115 may not significantly impact performance considering the avoidance of caching data in NVM 130 in local memory 115. In an example, NVM 130 may have a latency less than ten times the latency of local memory 115. For example, NVM 130 (e.g. 3D-XPoint NVM) may have a latency of approximately 300 nanoseconds to 500 nanoseconds while local memory 115 (e.g. for DRAM) may have latencies, for example, in the range of 10 to 100 nanoseconds.

File manager 122 may manage files accessed by applications (e.g. transaction processor 140). File manager 122 may memory map files stored in storage device 180 or NVM 130. A memory-mapped file may contain the contents of a file in virtual memory. Mapping between a file and memory space enables an application (e.g. with one or more processes) to modify the file by reading and writing directly to the memory. Memory-mapped files (MMFs) may permit applications to access files on disk in the same way they access local memory (e.g. using pointers). A view of all or part of a file on storage device 180 or NVM 130 may be mapped to a range of addresses within a process's address space. The process may access the content of a memory-mapped file by referencing an address in the designated range of addresses.

File manager 122 may, for example, memory map file 132 stored on NVM 130. Memory mapping a file (e.g. file 132) for access by an application (e.g. transaction processor 140) may involve file manager 122 (e.g. part of an OS) mapping a file (e.g. using CreateFileMapping( ) in Microsoft® Windows® or mmap( ) in Linux®) from address space in storage device 180 or NVM 130 to address space exposed to an application's virtual address space. Server computer 102 may use memory mapping and direct access (DAX) to access data stored in NVM 130. A memory mapped file in NVM 130 may be treated as byte addressable storage. DAX may eliminate copying file 132 to page cache (e.g. local memory 115) by enabling direct read and write access to files (e.g. file 132) stored in NVM 130. DAX may provide byte-addressable loads and stores to NVM in a persistent-memory-aware (PM-aware) file system. Memory mapped files may be mapped directly to virtual memory of an application with a byte-for-byte correlation between the two. An application may use pointers to operate on the data through normal loads and stores in a byte-addressable fashion. Although, in a PM-unaware file system, paging (rather than byte-addressable) operations may be performed. DAX in a PM-aware file system allows an OS kernel to configure direct load-store access to NVM for direct byte-level access.

Applications (e.g. transaction processor 140) may use system calls (e.g. memcpy( ), memmap( )) to access NVM 130.

File manager 122 may maintain data structures for files. A File Control Block (FCB) is an example of a file system data structure. An FCB may maintain information about the state of an open file (e.g. similar to a buffer descriptor maintaining a state of a page portion of a file). In an example, a file object (e.g. FCB) may maintain information, such as a file handle, a file name, an address, a file size, a PD, PD access control information (e.g. address and current settings), a timestamp of a most recent modification, and so on. An FCB may reference memory locations for data stored in local memory 115 or NVM 130. Although file manager 122 may be implemented in an operating system (OS), an FCB for a file may reside in process address space for an application that uses the file (e.g. transaction processor 140), for example, rather than in OS memory address space.

Server computer 102 (e.g. database server) may have a subsystem (not shown) to provide data atomicity and durability while writing data, such as a subsystem that implements write-ahead logging (WAL) in association with writing data to a database. Buffer pool manager 120 may (e.g. also) include an algorithm that determines whether buffers in buffer pool 110 are freed to use for other data. A replacement algorithm may be referred to as a "page replacement algorithm," such as a least-recently used (LRU) replacement algorithm. Page replacement algorithms and WAL subsystems may be utilized with file protection domains and management thereof (e.g. using a buffer pool manager and/or a file manager) described herein.

An application (e.g. transaction processor 140) may access data stored in buffer pool 110. Buffer pool manager 120 may manage buffer pool 110. An application (e.g. transaction processor 140) may be assigned a range of memory locations in a virtual memory of a computer (e.g. server computer 102). A memory manager (e.g. in an OS for the computer) may map the range of virtual memory locations to buffers in buffer pool 110. Buffer pool manager 120 may determine which buffers are available or free, and which buffers are used.

An application (e.g. transaction processor 140) may request access to data stored persistently in NVM 130. File manager 122 may instruct a memory manager to perform memory mapping, where a range of addresses in the application's virtual address space may be mapped to a range within the data stored in NVM 130. This correlation may permit applications to treat data (e.g. file 132) as if it were in local memory. A memory manager may manage movement of data into and out of buffer pool 110 in a manner transparent to applications. A memory manager may transfer an address range of data in NVM 130 into an available buffer in buffer pool 110, for example, when access to data in that range of data is requested by the application. Buffer pool manager 120 may, e.g., using a replacement algorithm, identify one or more buffers to be made free, e.g., for replacement. A variety of replacement algorithms may be used, such as an LRU algorithm, an example of which may be found in Effelsberg, W., et al., "Principles of Database Buffer Management", in ACM Transactions on Database Systems, Volume 9, Issue 4, pp. 560-595, December 1984.

Buffer pool manager 120 may not free a buffer associated with new or modified application data, for example, before logging a commit record for a transaction (e.g. a set of actions that are atomic and durable) to durable storage. Such buffers may be referred to as "dirty." A buffer that contains data from a file or database that is intended to be modified, such as a file that has been open for write access, but where the data has not yet been modified, may be distinguished from a buffer with modified data. A buffer of unmodified data may be referred to as "ready to dirty." Such data, and buffers including read-only data, may readily be made free by buffer pool manager 120.

In database systems, and some file systems and some other computer systems, additional protocols may be used to ensure data atomicity and durability. For example, a database system may not allow a "dirty" buffer to be freed before logging a commit record for a transaction to durable storage. Atomicity, consistency, isolation, and durability (ACID) principles in transaction-oriented systems may support recovery in the event of failures include. See Haerder, T., and Reuter, A., "Principles of Transaction-Oriented Database Recovery—A Taxonomy", in ACM Computing Surveys, vol. 15, No. 4, pp. 287-317, December 1983. Recovery principles may be embodied in commercial implementations of transactional database systems and other transaction-oriented systems, such as distributed file systems, distributed operating systems, relational database systems, object-oriented database systems, fault-tolerant computer systems, highly available computer systems, real-time operating systems, object-oriented operating systems, distributed data collection systems, and the like.

For example, a database server may implement WAL. Data in a dirty buffer may be written back to the same storage location in NVM 130 from where it was read. Log records representing changes to the data may (e.g. must) already be on durable storage before the changed data replaces the previous version of that data on nonvolatile storage. A system may not be allowed to write data from a dirty buffer to NVM 130 until undo portions of log records that describe the changes to the data have been written to durable storage. Details of an implementation of WAL may be found in Mohan, C., et al., "ARIES: A Transaction Recovery Method Supporting Fine-Granularity Locking and Partial Rollbacks Using Write-Ahead Logging", in ACM Transactions on Database Systems, Vol. 17, No. 1, pp. 94-162, March 1992.

An I/O stack may contribute significant overhead to access information on storage device 180. In contrast, DAX loads and stores to NVM 130 may significantly reduce latency and improve SQL CPU efficiency. However, malfunctions (e.g. stray writes directly to NVM) may corrupt a database file such as file 132. File 132 may be at risk of corruption, for example, given direct write access to NVM 130 without writing to data in local memory 115 first then pushing out to NVM 130. For example, an application, such as transaction processor 140 (e.g. SQL Linux or SQL Windows), may use memory mapping based DAX read and write accesses for NVM resident files such as file 132.

Protection domains (PDs) may protect buffers (e.g. buffer pages) and/or files (e.g. at file or page level) from corruption (e.g. by a stray write access). A protected page may be associated with address space in local memory 115 or NVM 130. A protected file may be associated with address space in NVM 130. Embodiments with buffer and/or file protection domains (PDs) may be implemented, for example, transparent to page replacement algorithms and WAL.

PD manager 124 may reserve and allocate PDs. PD manager 124 may manage PDs for assignment to processes, pages, files, etc. PDs may be assigned, controlled and enforced to protect processes and/or data (e.g. buffer pages, memory mapped files at file or page levels and so on) from corruption and/or other undesirable access. PD manager 124 may, for example, allocate a set of PDs and disable access (e.g. write and/or read access) by a (e.g. each or every)

process and/or thread to memory protected by a PD (e.g. even when there may not be any allocations at the time). In an example, a maximum number of PDs may be reserved or configured to protect process address spaces and/or for other purposes (e.g. protecting, at a file-level or page-level, memory mapped files stored on non-volatile memory). A PD may be freed and reassigned to a different process, file, page, etc. or may be concurrently assigned to multiple processes, files, pages, etc., for example, when the number of processes, files, pages, etc. exceeds the number of PDs. PD manager 124 may be implemented, for example in an operating system (OS), such as Windows® NT or Linux®.

PD manager 124 may, for example, reserve and allocate PDs, e.g., based on request/demand or predefined configuration. In an example, PD manager 124 may, for example (e.g. out of M PDs), reserve N PDs to protect processes, X PDs to protect pages and Y PDs to protect files. Buffer pool manager 120 may, for example, manage the X PDs to protect pages. Buffer pool manager 120 may manage one or more of the X PDs, for example, to protect files at a page-level. File manager 122 may manage Y PDs to protect files at a file level. In an example, PD manager 124 may allocate N PDs to a library OS executed in user space with multiple application processes, where the library OS may manage the N process PDs. In an example, an application (e.g. transaction processor 140 such as Microsoft SQL Server®) may be executed with a library OS in a host OS process that shares memory in user mode, in which case multiple processes may be protected by process PDs, buffers may be protected by buffer PDs and/or memory mapped files may be protected by file PDs at file or page levels. Process, buffer and file PDs may overlap or nest. Overlapping PDs may operate together (e.g. a process PD may operate independent of a buffer PD) or may override one another (e.g. a PD associated with a narrow (subrange) address space may override a PD associated with a larger address space).

A page protection key (PKEY) is an example of a PD. A PKEY may provide a user-accessible, page-level procedure to grant and revoke access permission without impacting performance (e.g. without changing page tables). PKEYs may be used with or without page-based memory permissions in page tables. In contrast to PKEY type PDs, changing permissions in page tables may involve time-consuming system calls, TLB shoot downs and misses.

In an example of a PKEY (e.g. as a userspace feature in Intel® Skylake™ Scalable Processor Server CPUs), a page table entry (PTE) may support multiple (e.g. 16) protection domains (e.g. 4 bit PKEY in a 64 bit PTE). A PKEY may be allocated (e.g. prior to use), for example, by using a pkey_alloc( ) system call in Linux, which may, for example, "tag" an address space (e.g. a page in a page table) with a selected PKEY. A pkey_mprotect system call in Linux may be used to designate access control (e.g. read access, write access) for address space associated with a PKEY. A pkey_free system call in Linux may free a process, buffer or file and its associated address space (e.g. disassociate it with a PKEY). Permissions may be specified for a (e.g. each) protection domain (PKEY), for example, in a thread-private userspace CPU register, referred to as PKRU. As a CPU register, a PKRU may be thread-local, which may provide a (e.g. each) thread a different set of protections from every other thread for the same memory pages. PKRU permissions may be accessed, for example using read and write instructions (e.g. RDPKRU and WRPKRU). In an example memory access, a PTE in a page table lookup may provide a protection domain (PKEY) for an access while PKRU register content may provide a corresponding domain-specific permission (e.g. to determine whether access permission and write permission are enabled or disabled).

Figure 2:
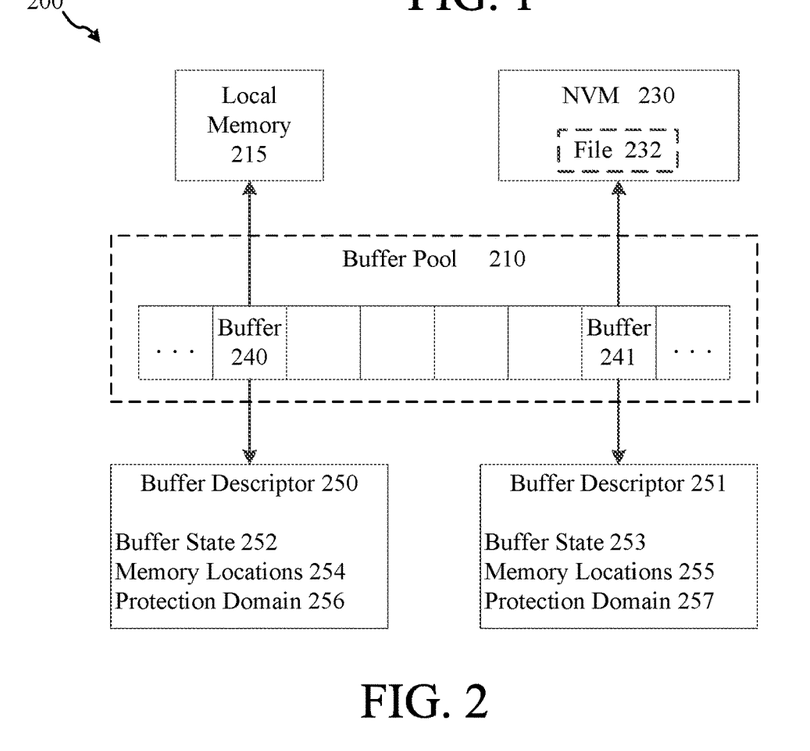
FIG. 2 shows an example of protecting a file at a page-level, according to an example embodiment.
Figure 3:
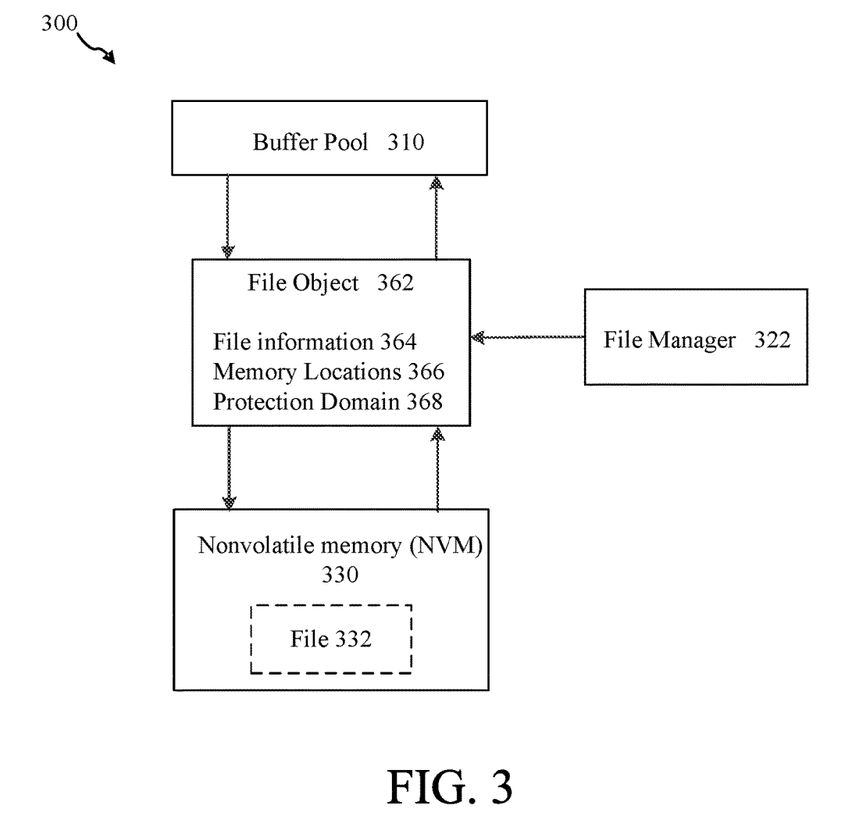
FIG. 3 shows an example of protecting a file at a file-level, according to an example embodiment.

A buffer (e.g. regardless whether it references local memory 115 or NVM 130) may be protected from access (e.g. unauthorized access or overwrite corruption) by a PD (e.g. PKEY). Similarly, a PD may be used to protect file 132 (e.g. at a page level (e.g. as shown in FIG. 2) or a file level (e.g. as shown in FIG. 3). Buffer and file PDs may be managed, respectively, by buffer pool manager 120 and file manager 122.

Buffer pool manager 120 may, for example, manage (e.g. assign and configure) buffer (e.g. page-level) PDs. PDs may be allocated, for example, on demand. Buffer pool manager 120 may associate a PD with a buffer (e.g. buffer page), creating a buffer PD. Buffer pool manager 120 may associate a buffer PD (e.g. a PKEY) with an address space. In an example, a buffer object (e.g. buffer descriptor) may indicate an association between a page PD and an address space associated with a buffer page. Buffer pool manager 120 may set and enforce protections for a protection domain that protects a buffer page.

File manager 122 may, for example, manage (e.g. assign and configure) file (e.g. page-level) PDs. PDs may be allocated, for example, on demand File manager 122 may associate a PD with a file, creating a file PD, and protect the file at a file or page level. File manager 122 may associate a file PD (e.g. a PKEY) with an address space. In an example, a file object (e.g. file control block) may indicate an association between a file PD and an address space associated with a file. file manager 122 may set and enforce protections for a protection domain that protects a file.

FIG. 2 shows an example of protecting a file at a page-level, according to an example embodiment. FIG. 2 shows an example of buffer protection domains, including protection of a file at a page-level. FIG. 2 shows a block diagram of example data structure 200 for buffer pool 210. Buffer pool 210 shows an example of buffer pool 110 comprising buffers that may be associated with PDs, which may be managed by a buffer pool manager (e.g. buffer pool manager 120).

Buffer pool 210 may comprise a data structure that defines a collection of logical buffers 240, 241, etc. Buffer pool 210 may comprise a paged buffer pool. A buffer pool data structure may use any suitable structure to represent a collection of logical buffers, such as an array (e.g. of page buffers). A logical buffer may reference memory locations (e.g. for pages of data stored) in local memory 215 (such as DRAM) or in NVM 230. In an example, first logical buffer 240 may reference local memory 215 and second logical buffer 241 may reference NVM 230. In an example, there may be tens of thousands of pages per file in NVM 230. A (e.g. each) logical buffer may be represented by a data structure, which may be referred to as a buffer descriptor. In an example (e.g. as shown in FIG. 2), first logical buffer 240 may be represented by first buffer descriptor 250 and second logical buffer 241 may be represented by second buffer descriptor 251.

A buffer descriptor may include, for example, data defining a buffer state, a reference to memory locations, such as a pointer, among other information, such as a protection domain (PD), protection state (e.g. read and/or write access settings) and/or protection control information (e.g. PKRU address bits). A buffer state may be selected from a set of possible states of the buffer, including, for example, read-only, ready to dirty, dirty (e.g. data in the buffer has been modified or is new and is not yet written to persistent storage), or other state. A reference in a buffer descriptor to memory locations may be a reference to memory locations in local memory 115 or in NVM 130. A buffer descriptor may have one or more memory location fields. In an example, a buffer descriptor may have multiple memory location references (e.g. a first reference to local memory 215 and a second reference to NVM 230).

In an example, buffer pool manager 120 may associate a first buffer PD (e.g. PD 256) with a first buffer (e.g. buffer 240) and a second buffer PD (e.g. PD 257) with a second buffer (e.g. buffer 241). Buffer pool manager 120 may associate (e.g. in first buffer descriptor 250) the first buffer PD (e.g. PD 256) with a first address space (e.g. memory locations 254) associated with the first buffer (e.g. buffer 250). Buffer pool manager 120 may associate (e.g. in a second buffer descriptor 251) the second buffer PD (e.g. PD 257) with a second address space (e.g. memory locations 255) associated with the second buffer (e.g. buffer 241).

First buffer descriptor 250, representing first logical buffer 240, may include, for example, first buffer state 252, first memory locations 254 and first protection domain 256 (e.g. alone or combined with other information, such as protection state and/or protection control information). First memory locations 254 may, for example, reference memory locations storing a page of data. First memory locations 254 may comprise, for example, an address pointer to data in local memory 215.

Second buffer descriptor 251, representing second logical buffer 241, may include, for example, second buffer state 253, second memory locations 255 and second protection domain 257 (e.g. alone or combined with other information, such as protection state and/or protection control information). Second memory locations 255 may, for example, reference memory locations storing a page of data. Second memory locations 255 may comprise, for example, an address pointer to data in NVM 230.

Buffer pool manager 120 may manage buffer PDs, for example, by assigning and reassigning first and second buffer PDs 256, 257 to various buffers in buffer pool 210 according to buffer PD assignment logic. Buffer PD assignment logic may be based on, for example, whether a buffer references address space in NVM 230. In examples, buffer PD assignment logic may be randomly assigned to buffers or to buffers accessed by a process. In an example, second logical buffer 241 may be assigned second PD 257 because second memory locations 255 reference file 232 in NVM 230. An association between second PD 257 and second logical buffer 241 may be used to create an association between PD 257 and second memory locations 255 in second buffer descriptor 255.

In an example, second buffer PD 257 may comprise a PKEY. Buffer pool manager 120 may manage second buffer PD 257, for example, by disabling access (e.g. write access) to second memory locations 255 that reference address space storing at least a portion of file 232 in NVM 230. Buffer pool manager 120 may enable access (e.g. write access) to memory locations 255 for a window of time before and after a permitted access (e.g. a specific call), such as write access through a call stack by an application (e.g. transaction processor 140). Buffer pool manager 120 may control access by controlling PKRU read and write access control bits for second PD 257. For example, right before a write to file 232, buffer pool manager 120 may set a PKRU write access bit for second PD 257 to enable write access, perform a mem copy then, right after the mem copy, set the PKRU write access bit for second PD 257 to disable write access. Disabling access (e.g. write access) to memory locations 255 referencing address space in NVM 230 most of the time may substantially reduce the probability of errant corruption of NVM 230. In an example, tens to hundreds of databases may comprise NVM storage storing millions of files. A number of PDs may be limited. A PD may be assigned (e.g. alternatively or concurrently) to one or more buffers. A limited number of PDs may be sufficient to fend off a vast majority of potential errant corruptions by substantially reducing probabilities of errant corruptions.

FIG. 3 shows an example of protecting a file at a file-level, according to an example embodiment. Example file system 300 shows an example of file protection domains that protect a file at a file-level. File manager 322 may be part of an OS. File manager 322 may be implemented, for example, as part of an OS (e.g. a host OS, a library OS, a host (e.g. host OS) extension (HE), SQL OS) and/or as part of an application (e.g. SQL Linux, SQL Windows). File manager 322 may generate file objects (e.g. file object 362) for open instances of files (e.g. file 332). File objects may be used for interaction between buffer pool 310 and NVM 330.

File manager 322 may manage (e.g. assign and configure) file PDs. File manager 322 may allocate file PDs, for example, on demand File manager 322 may manage file PDs (e.g. PD 368), for example, by assigning and reassigning file PDs to various files in NVM 330 (and/or other NVMs) according to file PD assignment logic. File PD assignment logic may be based on, for example, whether a file references address space in NVM 230. In examples, file PD assignment logic may be randomly assigned to files or to files accessed by a process. An association between file PD 368 and file 332 may be used to create an association between PD 368 and file memory locations 366 in file object 362.

In an example, tens to hundreds of databases may comprise NVM storage storing millions of files. A number of PDs may be limited. A PD may be assigned (e.g. alternatively or concurrently) to one or more files. In an example, such as when a number of files exceeds a number of PDs allocated for files accessed by applications, PD 368 may be (e.g. alternatively or concurrently) assigned to multiple files. A limited number of file PDs may be sufficient to avoid a vast majority of potential errant corruption by substantially reducing probabilities of errant corruption.

File manager 122 may manage files (e.g. file 332) stored on NVM 330, for example, to support access to the files by applications (e.g. transaction processor 140) and to support buffering pages of data in buffer pool 310. File manager 322 may memory map file 332, for example, using CreateFileMapping( ) in Windows® or mmap( ) in Linux®, from address space in NVM 330 to address space exposed to an application's virtual address space. Files may be memory mapped automatically, for example, when stored on NVM. A view of all or part of address space occupied by file 332 on NVM 130 may be mapped to a range of addresses within an application's address space.

In an example (e.g. using PKEYs in a computer running Linux OS), one or more PKEYs may be allocated for files, for example, by using pkey_alloc( ). File 332 may be memory mapped, for example, by calling pkey_mprotect with the address range (memory locations 366) of all or a portion of file 332 to be mapped to associate memory locations 366 with the PKEY. File object (e.g. FCB) 362 may be saved with file information 364 (e.g. file handle, file name, file size, PKRU access control information for PKEY, PKRU current settings, a timestamp of a most recent modification, and so on), memory locations 366 (e.g. address pointer, address range(s)), PD (e.g. PKEY) 368. PD (e.g.

PKEY) may be freed to make it available for other allocations, for example, using pkey_free( ).

File manager 322 may manage memory mapped files, for example, using file objects. In an example, file manager 322 may create file object 362 to manage file 332. File object 362 may comprise an FCB, which may reside in process address space for an application that uses the file (e.g. transaction processor 140). File manager 322 may associate a PD (e.g. PD 368) with file 332. File manager 322 may associate file PD (e.g. PKEY) 368 with an address space. In an example, file object (e.g. FCB) 362 created by file manager 122 may indicate an association between a file PD (e.g. PD 368) and an address space (e.g. memory locations 366) associated with a file (e.g. file 132).

File object 362 may maintain information about the state of file 332. In an example, file object 332 may maintain information, such as a file handle, a file name, an address space storing the file (e.g. memory locations 366), a file size, a PD (e.g. PD 368), PD access control information (e.g. PD access control address and current settings), a timestamp of a most recent modification, and so on. PD 368 may comprise a PKEY. PD access control information may comprise PKRU read and write access control bits for the PKEY.

Memory-mapped file 332, represented by file object 362, may be addressable in virtual address space for an application, permitting the application to modify memory mapped file 332 by reading and writing directly to address space on NVM 330 in the same way the application accesses local memory. An application may use direct access (DAX) to access memory mapped file 332. An application may treat memory mapped file 332 as byte addressable storage. DAX may eliminate copying file 332 to page cache (e.g. local memory 115) by enabling direct read and write access to file 332. Applications (e.g. transaction processor 140) may use a memory copy call (e.g. memcpy( ), memmap( )) to access (e.g. read and write) file 332.

File 332 may be protected (e.g. by protecting address space storing the file) at a file level or a page level. File object 362 may be utilized in support of protecting a file a file level or a page level. File manager 322 and/or an application (e.g. transaction processor 140) using file 332 may set and enforce protections for file PD 332. In an example process to protect a file with a PD, write access may be mostly disabled, with temporarily enablement of write access to an address range storing file 332 for a valid write (e.g. a write by an application that goes through a proper call stack).

In an example, file PD 368 may comprise a PKEY. File manager 322 (or an application accessing file 332) may manage access to a file 332 by controlling access associated with file PD 368. Access may be controlled, for example, by disabling access (e.g. write access) to file memory locations 366 that reference address space storing all or a portion of file 332 in NVM 230. File manager 322 may enable access (e.g. write access) to file memory locations 366 for a window of time before and after a permitted access, which may comprise a write access through a proper call stack by an application (e.g. transaction processor 140). File manager 322 (or application 140) may control access to file 332, for example, by controlling PKRU read and write access control bits for file PD 368. In an example, right before a write to file 332, file manager 322 (or application 140) may set a PKRU write access bit for file PD 368 to enable write access to memory locations 366, perform a mem copy to complete the write then, right after the mem copy, set the PKRU write access bit for file PD 368 to disable write access to memory locations 366. Disabling access (e.g. write access) to file memory locations 366 referencing address space in NVM 330 most of the time may substantially reduce the probability of errant corruption of file 332.

Implementations are not limited to the examples shown. Any number of computing devices and/or servers (including but not limited to machines and/or virtual machines) may be coupled in any manner via any type of computing environment. For example, one or more of computing device, server or storage components may be co-located, located remote from each other, combined or integrated on or distributed across one or more real or virtual machines. For example, authentication server 140 may include an authorization server. Example system 100 or components therein may operate, for example, according to example methods presented in FIGS. 4-8.

Figure 4:
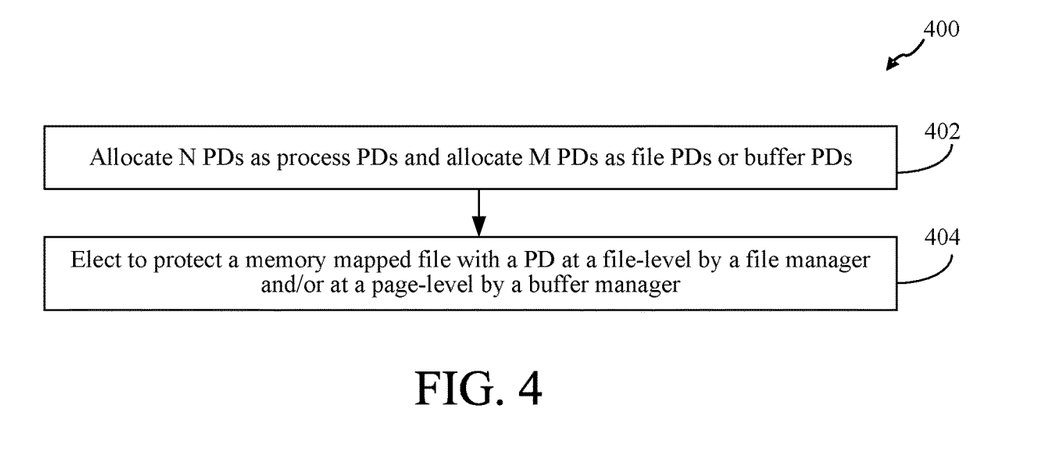
FIG. 4 shows a flowchart of a method for managing protection domains, according to an example embodiment.

Embodiments may also be implemented in processes or methods. For example, FIG. 4 shows a flowchart of a method for managing protection domains, according to an example embodiment. Embodiments disclosed herein and other embodiments may operate in accordance with example method 400. Method 400 comprises steps 402-404. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 4. FIG. 4 is simply one of many possible embodiments. Embodiments may implement fewer, more or different steps.

Method 400 is an example of managing PDs for multiple (e.g. configurable) purposes (e.g. processes, files at buffer page-level or file-level). Method 400 comprises step 402. In step 402, PDs may be allocated. For example, N PDs may be allocated as process PDs and M PDs may be allocated as file PDs or buffer PDs. N may be an integer value of zero or more and M may be an integer value of zero or more. A combined value of N and M may be limited by a maximum number of PDs available for allocation. For example, as shown in FIG. 1, PD manager 124 may allocate PDs based on allocation logic. PD allocation logic may depend on an implementation (e.g. sandboxed implementation of an application with a library OS).

In step 404, an election or determination may be made to protect a memory mapped file with a PD at a file-level by a file manager and/or at a page-level by a buffer manager. For example, as shown in FIG. 1, server computer 102 (e.g. its OS) may be configured to protect memory mapped files with PDs at a page level with buffer pool manager 120 or at a file-level with file manager 122.

Figure 5:
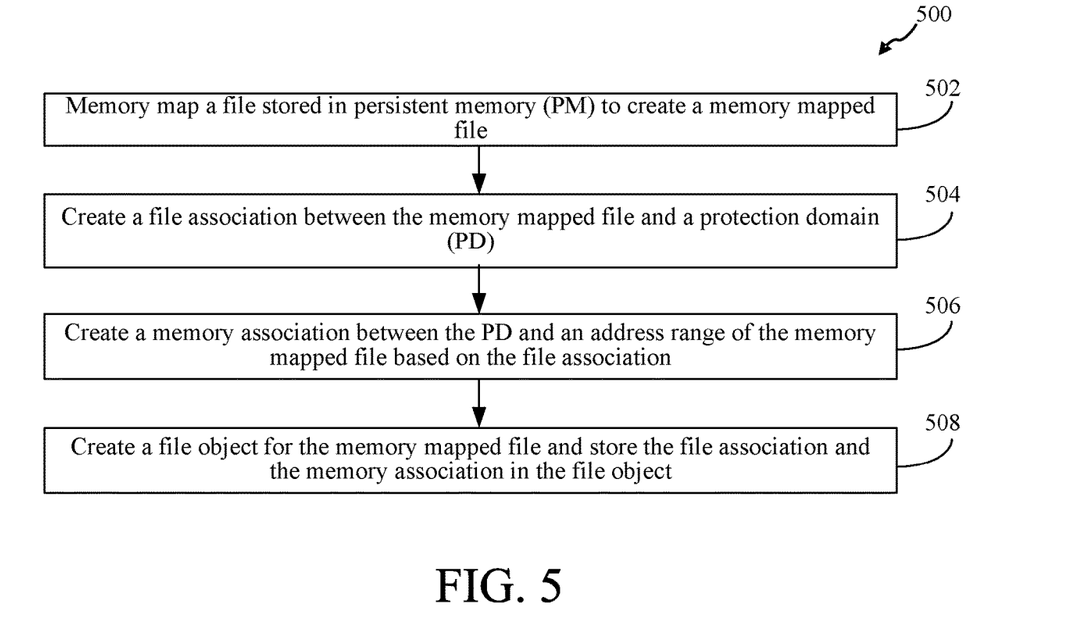
FIG. 5 shows a flowchart of a method for managing protection domains for files at a file-level, according to an example embodiment.

FIG. 5 shows a flowchart of a method for managing protection domains for files at a file-level, according to an example embodiment. Embodiments disclosed herein and other embodiments may operate in accordance with example method 500. Method 500 comprises steps 502-508. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 5. FIG. 5 is simply one of many possible embodiments. Embodiments may implement fewer, more or different steps.

Method 500 comprises step 502. In step 502, a file stored in persistent memory (PM) may be memory mapped to create a memory mapped file. For example, as shown in FIGS. 1 and 3, file 332 stored in NVM 330 may be mapped to virtual address space for an application (e.g. transaction processor 140), creating a memory mapped file represented by file object 362.

In step 504, a file association may be created between the memory mapped file and a protection domain (PD). For example, as shown in FIG. 3, a file association is created by associating PD 368 with memory mapped file 332.

In step 506, a memory association may be created between the PD and an address range of the memory mapped file based on the file association. For example, as shown in FIG. 3, a memory association is created by associating PD 368 with memory locations 366 for memory mapped file 332, based on the file association between PD 368 and memory mapped file 332.

In step 508, a file object may be created for the memory mapped file and the file association and the memory association may be stored in the file object. For example, as shown in FIG. 3, file object 362 is created for memory mapped file 332. The file association between file 332 and PD 368 and the memory association between PD 368 and memory locations 366 are stored in file object 362.

Figure 6:
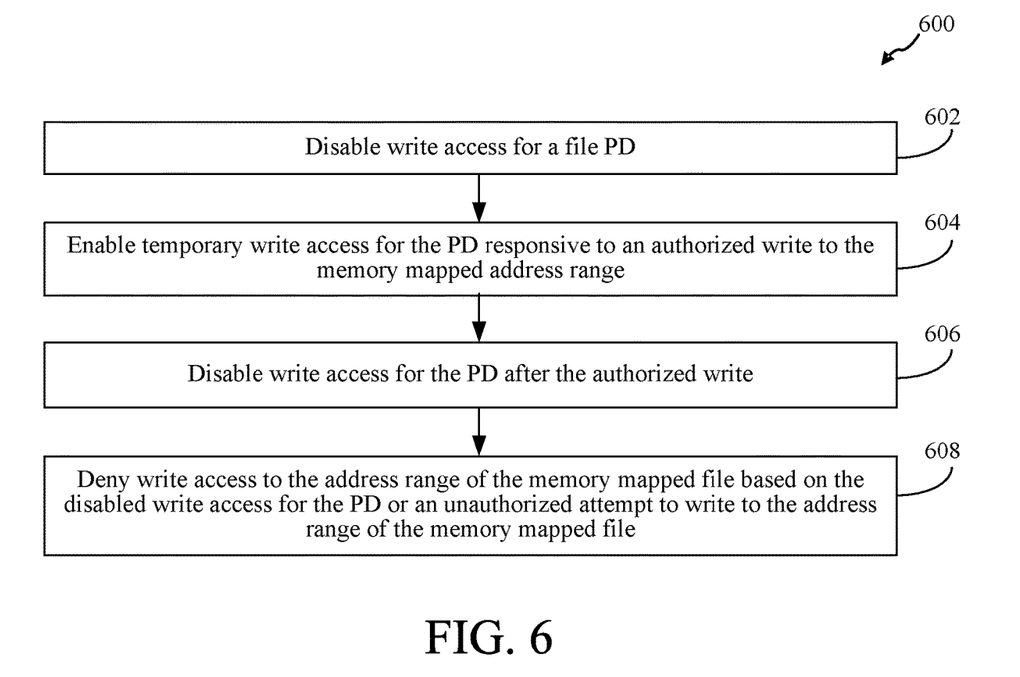
FIG. 6 shows a flowchart of a method for controlling access to a protection domain for a file at a file-level, according to an example embodiment.

FIG. 6 shows a flowchart of a method for controlling access to a protection domain for a file at a file-level, according to an example embodiment. Embodiments disclosed herein and other embodiments may operate in accordance with example method 600. Method 600 comprises steps 602-608. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 6. FIG. 6 is simply one of many possible embodiments. Embodiments may implement fewer, more or different steps.

Method 600 comprises step 602. In step 602, write access may be disabled for a file PD. For example, as shown in FIGS. 1 and 3, file manager 122 or 322 or transaction processor 140 may disable write access to file 332 protected by PD (e.g. PKEY) 368 by setting PKRU write access bit for PKEY 368 to disabled, e.g., based on PKRU control information in file object 362.

In step 604, temporary write access may be enabled for the PD responsive to an authorized write to the memory mapped address range. For example, as shown in FIGS. 1 and 3, file manager 122 or 322 or transaction processor 140 may temporarily enable write access to file 332 protected by PD (e.g. PKEY) 368 by setting PKRU write access bit for PKEY 368 to enabled, e.g., based on a valid write access.

In step 606, write access may be disabled for the PD after the authorized write. For example, as shown in FIGS. 1 and 3, file manager 122 or 322 or transaction processor 140 may disable write access to file 332 protected by PD (e.g. PKEY) 368 by setting PKRU write access bit for PKEY 368 to disabled, e.g., after completion of a memory copy call to file 332.

In step 608, write access may be denied to the address range of the memory mapped file based on the disabled write access for the PD or an unauthorized attempt to write to the address range of the memory mapped file. For example, as shown in FIGS. 1 and 3, file manager 122 or 322 may deny write access to file 332 based on association with PD 368 and its PKRU write access bit set to disabled, as may be indicated in file object 362.

Figure 7:
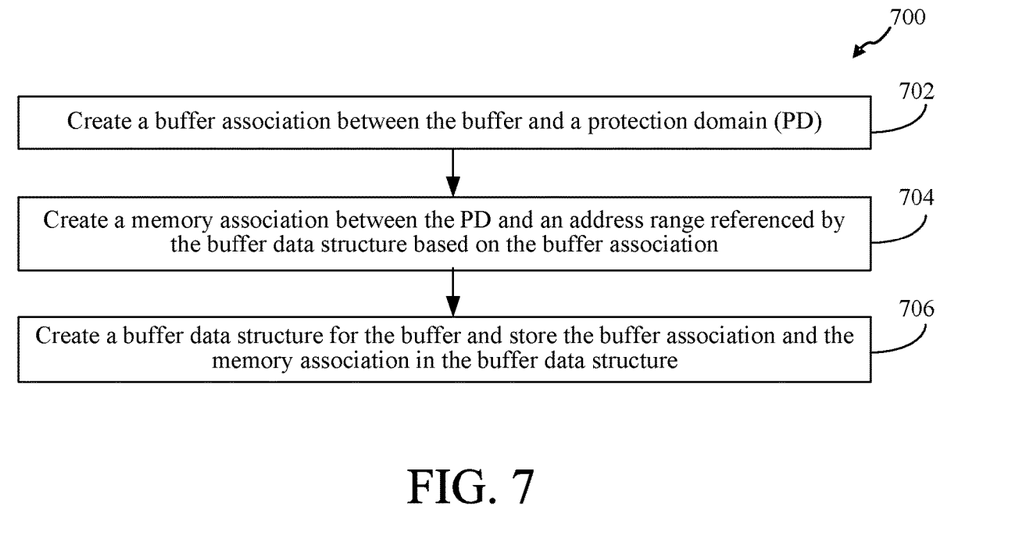
FIG. 7 shows a flowchart of a method for managing protection domains for files at a page-level, according to an example embodiment.

FIG. 7 shows a flowchart of a method for managing protection domains for files at a page-level, according to an example embodiment. Embodiments disclosed herein and other embodiments may operate in accordance with example method 700. Method 500 comprises steps 702-706. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 7. FIG. 7 is simply one of many possible embodiments. Embodiments may implement fewer, more or different steps.

Method 700 comprises step 702. In step 702, a buffer association may be created between the buffer and a protection domain (PD). For example, as shown in FIGS. 1 and 2, a buffer association may be created by associating PD (e.g. PKEY) 257 with buffer 241.

In step 704, a memory association may be created between the PD and an address range referenced by the buffer data structure based on the buffer association. For example, as shown in FIG. 2, a memory association may be created by associating PD 257 with memory locations 255 for memory mapped file 232, based on the buffer association between PD 257 and buffer 241.

In step 706, a buffer data structure may be created for the buffer and the buffer association and the memory association may be stored in the buffer data structure. For example, as shown in FIG. 2, buffer descriptor 251 may be created for buffer 241. The buffer association between buffer 241 and PD 257 and the memory association between PD 257 and memory locations 255 may be stored in buffer descriptor 251.

Figure 8:
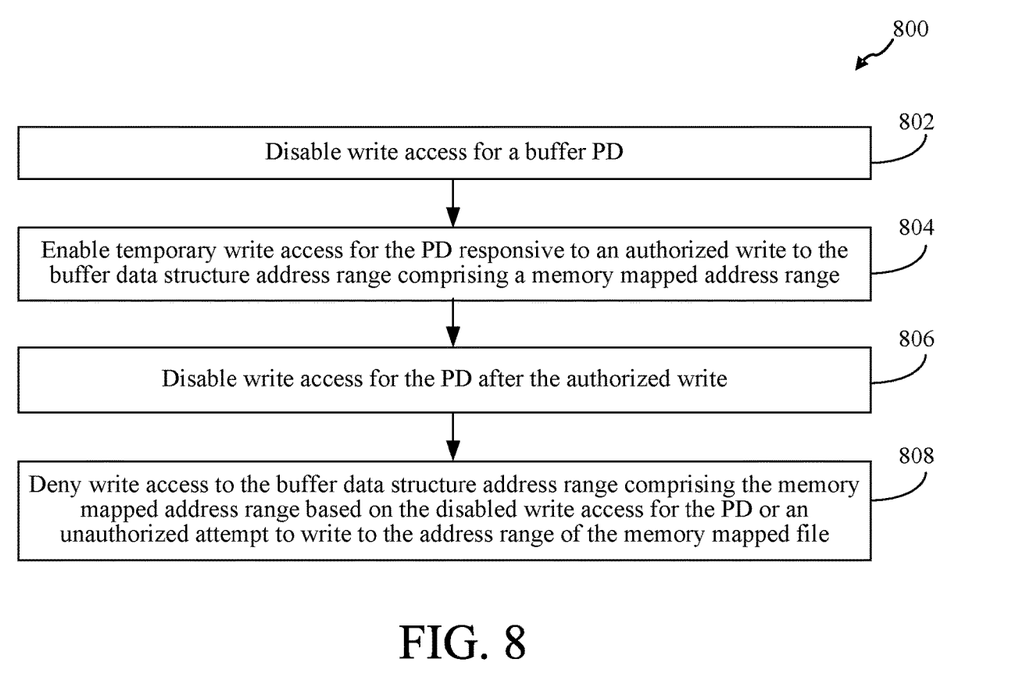
FIG. 8 shows a flowchart of a method for controlling access to a protection domain for a file at a page-level, according to an example embodiment.

FIG. 8 shows a flowchart of a method for controlling access to a protection domain for a file at a page-level, according to an example embodiment. Embodiments disclosed herein and other embodiments may operate in accordance with example method 800. Method 800 comprises steps 802-808. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 8. FIG. 8 is simply one of many possible embodiments. Embodiments may implement fewer, more or different steps.

Method 800 comprises step 802. In step 802, write access may be disabled for a buffer PD. For example, as shown in FIGS. 1 and 2, buffer pool manager 120 or 220 or transaction processor 140 may disable write access to file 232 protected by PD (e.g. PKEY) 257 by setting PKRU write access bit for PKEY 257 to disabled, e.g., based on PKRU control information in buffer descriptor 251.

In step 804, temporary write access may be enabled for the PD responsive to an authorized write to the buffer data structure address range comprising a memory mapped address range. For example, as shown in FIGS. 1 and 2, buffer pool manager 120 or 220 or transaction processor 140 may temporarily enable write access to file 232 protected by PD (e.g. PKEY) 257 by setting PKRU write access bit for PKEY 257 to enabled, e.g., based on a valid write access.

In step 806, write access may be disabled for the PD after the authorized write. For example, as shown in FIGS. 1 and 2, buffer pool manager 120 or 220 or transaction processor 140 may disable write access to file 232 protected by PD (e.g. PKEY) 257 by setting PKRU write access bit for PKEY 257 to disabled, e.g., after completion of a memory copy call to file 232.

In step 808, write access may be denied to the buffer data structure address range comprising the memory mapped address range based on the disabled write access for the PD or an unauthorized attempt to write to the address range of the memory mapped file. For example, as shown in FIGS. 1 and 2, buffer pool manager 120 or 220 may deny write access to file 232 based on association with PD 257 and its PKRU write access bit set to disabled, as may be indicated in buffer descriptor 251.

III. Example Computing Device Embodiments

As noted herein, the embodiments described, along with any modules, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

FIG. 9 shows an exemplary implementation of a computing device 900 in which example embodiments may be implemented. Consistent with all other descriptions provided herein, the description of computing device 900 is a non-limiting example for purposes of illustration. Example embodiments may be implemented in other types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing components and steps shown in examples and/or other example embodiments.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of example embodiments described herein. Accordingly, such computer programs represent controllers of the computing device 900.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

Methods, systems and computer program products are provided for managing protection domains (PDs) for files at a file-level or a page-level. PDs may be allocated for multiple purposes, e.g., to protect processes, files, buffers, etc. Files stored in nonvolatile memory (NVM) subject to direct access (DAX) may be protected by file-level or page-level PDs. PDs may comprise protection keys (PKEYs) with user-configurable read and write access control registers (PKRUs). NVM files may be protected from corruption (e.g. by stray writes) by leaving write access disabled except for temporary windows of time for valid writes. File PDs may be managed by a file manager while buffer PDs may be managed by a buffer pool manager. File associations between PDs, files and file address space may be maintained in a file object. Buffer associations between PDs, buffers and buffer address space may be maintained in a buffer descriptor.

In an example, a computing device may comprise one or more processors; and one or more memory devices that store program code configured to be executed by the one or more processors. The program code may comprise at least one of a file manager and a buffer manager. The file manager many be configured to memory map a file stored in persistent memory (PM) to create a memory mapped file; create a file association between the memory mapped file and a file protection domain (PD); and create a file memory association between the file PD and an address range of the memory mapped file based on the file association, wherein the file PD is configurable to control write access to the address range of the memory mapped file. The buffer manager may be configured to: create a buffer association between the buffer and a buffer PD; and create a buffer memory association between the buffer PD and an address range for the buffer based on the buffer association, wherein the buffer PD is configurable to control write access to the address range for the buffer.

In an example, the computing device comprises the file manager and the buffer manager and the address range for the buffer references at least a portion of the memory mapped file, and the program code further comprises: at least one of an application, an operating system and an operating system extension configured to determine whether to protect the memory mapped file with a PD at one of a file-level by the file manager and at a page-level by the buffer manager.

In an example, the file manager may be configured to: disable write access for the file PD; enable temporary write access for the file PD responsive to an authorized write to the memory mapped address range; and disable write access for the file PD after the authorized write.

In an example, the buffer manager may be configured to: disable write access for the buffer PD; enable temporary write access for the buffer PD responsive to an authorized write to the memory mapped address range; and disable write access for the buffer PD after the authorized write.

In an example, the computing device may further comprise an operating system configured to: allocate N PDs as process PDs; and allocate M PDs as file PDs or buffer PDs.

In an example, the file manager may be configured to: create a first file association between a first memory mapped file and a first PD; and create a second file association between a second memory mapped file and the first PD concurrently with or alternatively to the first file association when a number of memory mapped files exceeds the M allocated PDs.

In an example, the buffer manager may be configured to: create a first buffer association between a first buffer and a second PD; and create a second buffer association between a second buffer and the second PD concurrently with or alternatively to the first buffer association when a number of buffers exceeds the M allocated PDs.

In an example, at least one of the file PD and the buffer PD is specified by a protective key (PKEY) configured with a write access register for enabling and disabling write access.

In an example, a method for managing a protective domain (PD) for a file may comprise, for example, memory mapping a file stored in persistent memory (PM) to create a memory mapped file; creating a file association between the memory mapped file and the PD; and creating a memory association between the PD and an address range of the memory mapped file based on the file association, wherein the PD is configurable to control write access to the address range of the memory mapped file.

In an example, the method may further comprise, for example, disabling write access for the PD; enabling temporary write access for the PD responsive to an authorized write to the memory mapped address range; and disabling write access for the PD after the authorized write.

In an example, the method may further comprise, for example, disabling write access to the address range of the memory mapped file based on the disabled write access for the PD or an unauthorized attempt to write to the address range of the memory mapped file.

In an example, the method may further comprise, for example, creating a file object for the memory mapped file; and storing the file association and the memory association in the file object.

In an example, the file object may be maintained by an application, an operating system or a host operating system (OS) extension in an isolated process comprising the application.

In an example, the method may further comprise reading from and writing to the memory address range of the memory mapped file by a user-mode memory copy call.

In an example, the memory copy call may comprise reading a page of the memory mapped file to a buffer pool; or writing a page from the buffer pool to the memory mapped file.

In an example, the PD may be specified by a protective key (PKEY) configured with a write access register for enabling and disabling write access.

In an example, a method for managing a protective domain (PD) for a buffer may comprise, for example, creating a buffer association between the buffer and the PD; and creating a memory association between the PD and an address range referenced by the buffer data structure based on the buffer association, wherein the PD is configurable to control write access to the address range referenced by the buffer data structure.

In an example, the address range may comprise a memory mapped address range associated with a memory mapped file stored in persistent memory (PM). The method may further comprise disabling write access for the PD; enabling temporary write access for the PD responsive to an authorized write to the memory mapped address range; and disabling write access for the PD after the authorized write.

In an example, the method may further comprise disabling write access to the address range of the memory mapped file based on the disabled write access for the PD or an unauthorized attempt to write to the address range of the memory mapped file.

In an example, the method may further comprise creating a buffer data structure for the buffer; and storing the buffer association and the memory association in the buffer data structure.

In an example, the method may further comprise reading from and writing to the memory address range of the memory mapped file by a user-mode memory copy call.

In an example, the PD may be specified by a protective key (PKEY) configured with a write access register for enabling and disabling write access.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computing device, comprising:
    one or more processors; and
    one or more memory devices that store program code configured to be executed by the one or more processors, the program code comprising:
        a memory manager configured to memory map a file stored in persistent memory to create a first memory mapped file;
        a file manager configured to:
            create a first file association between the first memory mapped file and a file protection domain (PD);
            create a file memory association between the file PD and an address range of the first memory mapped file based on the first file association, wherein the file PD is configurable to control write access to the address range of the first memory mapped file; and
        a buffer pool manager configured to:
            create a first buffer association between a first buffer and a buffer PD; and
            create a buffer memory association between the buffer PD and an address range for the first buffer based on the first buffer association, wherein the buffer PD is configurable to control write access to the address range for the first buffer; wherein
        the file manager is further configured to create a second file association between a second memory mapped file and the file PD concurrently with or alternatively to the first file association when a number of memory mapped files exceeds a number of PDs allocated as file PDs or buffer PDs; or
        the buffer manager is further configured to create a second buffer association between a second buffer and the buffer PD concurrently with or alternatively to the first buffer association when a number of buffers exceeds the number of PDs allocated as file PDs or buffer PDs.

2. The computing device of claim 1, wherein the computing device comprises the file manager and the buffer manager, the address range for the first buffer references at least a portion of the first memory mapped file, and the program code further comprises:
    at least one of an application, an operating system and an operating system extension configured to determine whether to protect the first memory mapped file with a PD at a file-level by the file manager or a page-level by the buffer manager.

3. The computing device of claim 2, further comprising:
    an operating system configured to:
        allocate N PDs as process PDs; and
        allocate M PDs as file PDs or buffer PDs.

4. The computing device of claim 1, wherein at least one of the file PD and the buffer PD is specified by a protective key (PKEY) configured with a write access register for enabling and disabling write access.

5. A method, performed by at least one computing device, for managing a protective domain (PD) for a file, comprising:
    memory mapping a file stored in persistent memory to create a first memory mapped file;
    creating a first file association between the first memory mapped file and the PD;
    creating a memory association between the PD and an address range of the first memory mapped file based on the first file association, wherein the PD is configurable to control write access to the address range of the first memory mapped file at a file;
    creating a second file association between a second memory mapped file and the PD concurrently with or alternatively to the first file association when a number of memory mapped files exceeds a number of PDs allocated as file PDs or buffer PDs.

6. The method of claim 5, further comprising:
    disabling write access to the address range of the first memory mapped file based on the disabled write access for the PD or an unauthorized attempt to write to the address range of the first memory mapped file.

7. The method of claim 6, further comprising:
    creating a file object for the first memory mapped file; and
    storing the first file association and the memory association in the file object.

8. The method of claim 7, wherein the file object is maintained by an application, an operating system or a host operating system (OS) extension in an isolated process comprising the application.

9. The method of claim 8, wherein the authorized write to the address range of the first memory mapped file and reading from the address range of the first memory mapped file is performed by a user-mode memory copy call.

10. The method of claim 9, wherein the memory copy call comprises:
   reading a page of the first memory mapped file to a buffer pool; or
   writing a page from the buffer pool to the first memory mapped file.

11. The method of claim 5, wherein the PD is specified by a protective key (PKEY) configured with a write access register for enabling and disabling write access.

12. A method, performed by at least one computing device, for managing a protective domain (PD) for a buffer, comprising:
   creating a first buffer association between a first buffer and the PD;
   creating a memory association between the PD and an address range based on the first buffer association, wherein the PD is configurable to control write access to the address range and wherein the address range comprises at least one of a memory mapped address range at a page level associated with a memory mapped file stored in persistent memory or an address range associated with a page stored in local memory;
   creating a second buffer association between a second buffer and the PD concurrently with or alternatively to the first buffer association when a number of buffers exceeds a number of PDs allocated as file PDs or buffer PDs.

13. The method of claim 12, further comprising:
   disabling write access to the address range of the memory mapped file based on the disabled write access for the PD or an unauthorized attempt to write to the address range of the memory mapped file.

14. The method of claim 13, further comprising:
   creating a buffer data structure for the first buffer; and
   storing the first buffer association and the memory association in the buffer data structure.

15. The method of claim 14, wherein the write to the address range of the memory mapped file and reading from the address range of the memory mapped file is performed by a user-mode memory copy call.

16. The method of claim 12, wherein the PD is specified by a protective key (PKEY) configured with a write access register for enabling and disabling write access.

17. The computing device of claim 1, wherein
   the file manager is further configured to:
      deny access to the address range of the memory mapped file based on the disabled write access for the file PD; and
   the buffer manager is further configured to:
      deny write access to the address range for the buffer based on the disabled write access for the buffer PD.

18. The method of claim 5, further comprising:
   denying access to the address range of the memory mapped file based on the disabled write access for the PD.

19. The method of claim 14, further comprising:
   denying write access to the buffer data structure address range comprising the memory mapped address range based on the disabled write access for the PD.

20. The computing device of claim 2, wherein the program code comprises at least one of:
   the file manager configured to:
      disable write access for the file PD;
      enable temporary write access for the file PD responsive to an authorized write to the address range of the first memory mapped file; and
      disable write access for the file PD after the authorized write; or
   the buffer manager configured to:
      disable write access for the buffer PD;
      enable temporary write access for the buffer PD responsive to an authorized write to the address range for the first buffer; and
      disable write access for the buffer PD after the authorized write.

* * * * *